United States Patent [19]
Weber et al.

[11] Patent Number: 4,895,115
[45] Date of Patent: Jan. 23, 1990

[54] MOUNT WITH INSULATION FOR SOLID-CONDUCTED SOUND, IN PARTICULAR FOR AN INTERNAL COMBUSTION ENGINE

[75] Inventors: Otto Weber, Wolfsburg; Manfred Thesenvitz, Braunschweig; Volkmar Keck, Wolfsburg; Siegfried Grohnert, Cremlingen, all of Fed. Rep. of Germany

[73] Assignee: Volkswagen AG, Wolfsburg, Fed. Rep. of Germany

[21] Appl. No.: 308,097

[22] Filed: Feb. 8, 1989

[30] Foreign Application Priority Data
Feb. 19, 1988 [DE] Fed. Rep. of Germany ....... 3805145

[51] Int. Cl.$^4$ .......................... F16M 5/00; F16F 15/04
[52] U.S. Cl. ................................. 123/195 A; 248/352; 248/632; 267/140.5; 267/141.3
[58] Field of Search ......................... 123/195 A, 198 E; 248/560, 573, 575, 638, 352, 632; 267/140.2, 140.5, 141.3

[56] References Cited

U.S. PATENT DOCUMENTS

| | | | |
|---|---|---|---|
| 1,731,387 | 10/1929 | Masury | 267/140.5 |
| 2,382,372 | 8/1945 | Wallerstein | 267/140.2 |
| 3,430,901 | 3/1969 | Cauvin | 248/632 |
| 3,957,127 | 5/1976 | Bouchard et al. | 267/141.3 |
| 4,151,822 | 5/1979 | Miura et al. | 123/195 A |
| 4,424,961 | 1/1984 | Takei | 248/632 |
| 4,687,188 | 8/1987 | Knurek et al. | 248/562 |
| 4,717,130 | 1/1988 | Barkhage | 267/141.3 |

FOREIGN PATENT DOCUMENTS

| | | | |
|---|---|---|---|
| 0068529 | 4/1983 | Japan | 248/638 |
| 0088245 | 5/1983 | Japan | 248/638 |

*Primary Examiner*—David A. Okonsky
*Attorney, Agent, or Firm*—Brumbaugh, Graves, Donohue & Raymond

[57] ABSTRACT

In the representative sound-insulating engine mounts described in the specification, a resilient pad of elastomeric material is disposed between pan-shaped members having side walls which are spaced from the periphery of the resilient pad in the absence of dynamic loads so as to provide resilient stops for the pad deformation.

3 Claims, 2 Drawing Sheets ically an engine mount of the type described in the aforementioned German Pat. No. 3,506,977.

MOUNT WITH INSULATION FOR SOLID-CONDUCTED SOUND, IN PARTICULAR FOR AN INTERNAL COMBUSTION ENGINE

BACKGROUND OF THE INVENTION

This invention relates to sound-insulating mounts for internal combustion engines and, more particularly, to such mounts containing elastomeric material and having a stop limiting the deformation of the elastomeric material.

Heretofore, sound-insulating mounts of the foregoing type, which provide a substantially S-shaped characteristic curve of spring displacement plotted against load, have been described, for example, in German Pat. No. 3,506,977. As described in that patent, an engine mount having good insulation against conducted sound is provided despite deformation of an elastomeric pad by pre-stress and under dynamic load by providing an elastomeric material having transverse passages or cavities serving to convert acoustic energy into heat. In the mounts described therein, pan-shaped support elements embrace the elastomeric pad with sufficient clearance so as not to impede its deformation during dynamic operation. To provide a deformation-limiting stop, a peripheral region of one of the elements has a more or less C-shaped cross-section which embraces a marginal projection of the other element. The C-shaped peripheral region includes an elastic liner which is spaced from the marginal projection of the other element. When certain amplitudes of element displacement occur in the operation of the internal combustion engine for a motor vehicle, the elastic liner comes into contact with the marginal projection so that an elastic stop is provided.

An additional prior art reference is U.S. Pat. No. 1,729,394, which describes a mount for an internal combustion engine having a compressible pad of more complicated structure. In this case, the mount includes several components which are combined by a central bolt into a subassembly supplied in combination with an engine bracket and then riveted to a frame member in the vehicle. No pre-stress of the compressible pad is contemplated in that mount and the static load, i.e., the weight of the engine, is taken up by a spring which supports the bolt. In addition, this known design has no stop providing any elastic limitation of the compressible pad displacement.

SUMMARY OF THE INVENTION

Accordingly, it is an object of the present invention to provide a new and improved sound-insulating engine mount arranged in a simple and effective manner.

Another object of the invention is to provide a sound insulating mount for an internal combustion engine in a motor vehicle having a stop providing an elastic limit which is incorporated in the components of the mount.

These and other objects of the invention are attained by providing a sound-insulating mount having a resilient pad of elastomeric material disposed between rigid pan-shaped force-transmitting members and including an abutment spaced from a wall of the resilient pad so as to provide a resilient stop for the deformation of the resilient pad. One type of resilient stop is formed by a side wall of a pan-shaped force-transmitting member which is spaced from the resilient pad and, in another form, the resilient stop is provided by the outer surface of a central tightening element extending between the force-transmitting members in spaced relation from an inner surface of the resilient pad.

In accordance with the invention, therefore, a side wall, which is in any case required for lateral guidance of at least one of the elements, is used to form the stop by appropriate spacing between the side wall and the periphery of the resilient pad, the elasticity of the stop being determined in accordance with the resilience of the resilient pad, as measured in transverse direction, in the region of the side wall.

If the sound-insulating mount is of the type described in the aforesaid U.S. Pat. No. 1,729,394, having a central threaded bolt jointing the several parts of the mount into a subassembly and extending through a central hole in the resilient pad, the stop for elastic limitation of resilient displacement may be provided in accordance with the invention by suitable spacing between the outer wall of the tension device comprising the bolt and any sleeves surrounding the bolt and the adjacent internal surface of the resilient pad. In all cases, the deformation of the resilient pad results in elimination of the lateral spacing, that is, the resilient pad engages the side wall of the pan-shaped member or the peripheral wall of the central tension device and, in accordance with the elasticity of the spring pad in this region, an elastic stop effect is provided.

If the stop is intended to be a relatively hard stop acting immediately on occurrence of contact between the spring pad and the side wall of the pan-shaped member or the periphery of the tension device, the transverse hardness of the resilient pad is arranged to be higher in this region than in other regions.

BRIEF DESCRIPTION OF THE DRAWINGS

Further objects and advantages of the invention will be apparent from a reading of the following description of preferred embodiments in conjunction with the accompanying drawings in which.

DESCRIPTION OF PREFERRED EMBODIMENTS

Figure 1:
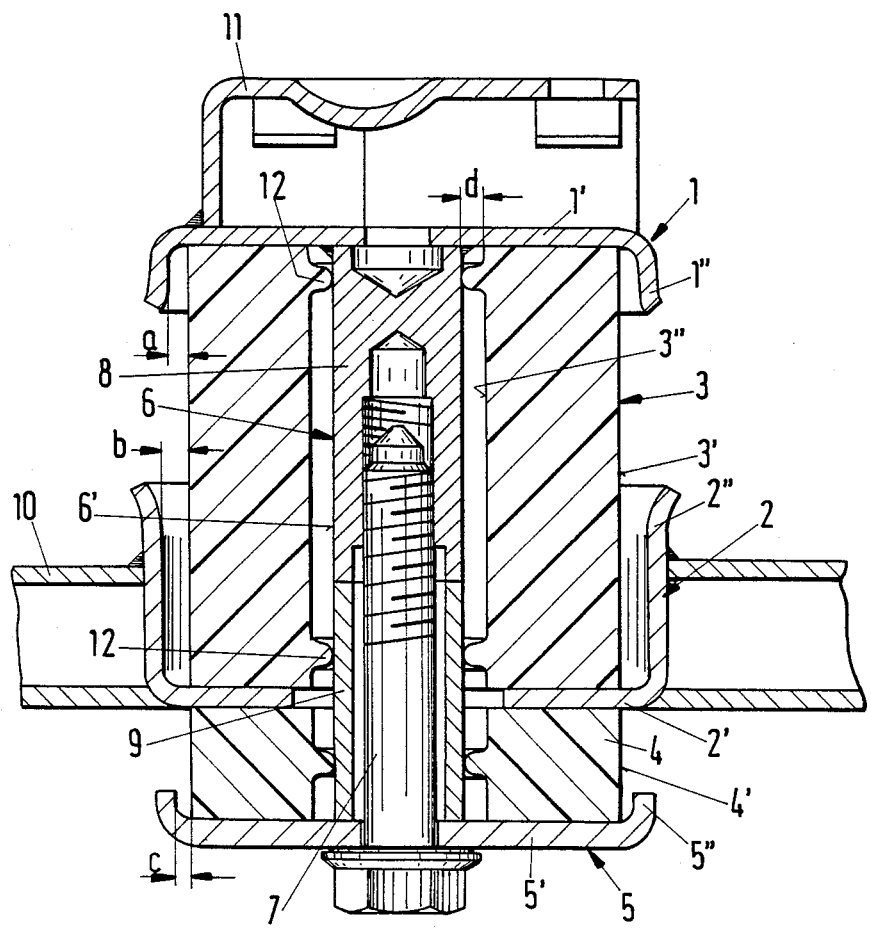
FIG. 1 is an axial sectional view through a representative sound-insulating mount in accordance with the invention in the form of a mount for a motor vehicle engine.

In the typical embodiment of the invention shown in FIG. 1, two pan-shaped members 1 and 2, having corresponding base surfaces 1' and 2' and side walls 1" and 2", embrace the opposite ends of a resilient pad 3 made of elastomeric material. A second resilient pad 4, also made of elastomeric material, is disposed between the bottom wall 2' of the member 2 and another pan-shaped member 5 which has a bottom wall 5' and a side wall 5" projecting in the direction of the member 2.

The mount arrangement is held together under tension by a tension device 6 consisting of a bolt 7, a threaded sleeve 8 welded to the member 1, and a spacer sleeve 9. Thus, the entire mount constitutes a subassembly, installed, for example, in a recess of an engine support or auxiliary chassis 10 of a motor vehicle. The member 1, which is uppermost in FIG. 1, is provided with a receptacle 11 arranged to be bolted, for example, to an engine bracket on an internal combustion engine, thereby reducing assembly work in the vehicle to a minimum.

Referring now to the relation between the side walls 1", 2" and 3" and the outer peripheries 3' and 4' of the resilient pads 3 and 4, FIG. 1 shows radial spacings a, b and c, which exist in the absence of a dynamic load on the mount. The spacings a, b and c are chosen in accordance with the hardness in transverse direction of the corresponding resilient pads 3 and 4 so that, at a preassigned pad displacement, that is to say a preassigned deformation of the resilient pads 3 and 4 of elastomeric material, the outer peripheries 3' and 4' engage the corresponding side walls 1", 2" and 5", thereby providing an elastic stop and hence constituting an elastic limitation of the resilient pad displacement. For the resilient pad 3, this limit occurs at certain load amplitudes in a downward direction as shown in FIG. 1, but with respect to the resilient pad 4, the limit is reached when the force acts in an upward direction as shown in FIG. 1.

These elastic limitations of resilient pad displacement are thus achieved by utilizing parts normally present in mount constructions, i.e., the side walls 1", 2" and 5" which provide lateral support for the mount. Yet this simplicity of design does not involve any sacrifice of the vibration-absorbing properties of the mount, since it has been found that extremely high degrees of insulation can be obtained with this arrangement. In particular, effective insulation is provided for the frequency range above 250 Hz. Moreover, the possibilities for frequency tuning are in no way limited with respect to the type of mount described in German Pat. No. 3,506,977 mentioned above. The mount of the invention also permits simple adaptation, for use in different vehicles for example.

It is likewise possible to provide a lateral spacing d between the outer periphery 6' of the tension device 6 and the inner periphery 3" of the resilient pad 3 in the dynamically unloaded condition of the mount in order to achieve an elastic limitation of resilient pad displacement. The spacing d is selected in accordance with the resilience of the pad so that it will vanish at correspondingly high deformation of the resilient pad 3 when the surfaces 3" and 6' come into contact. In this case, the inner surface 3" of the resilient pad 3 is spaced from the tension device 6 by spacer ribs 12 on the pad 3.

Figure 2:
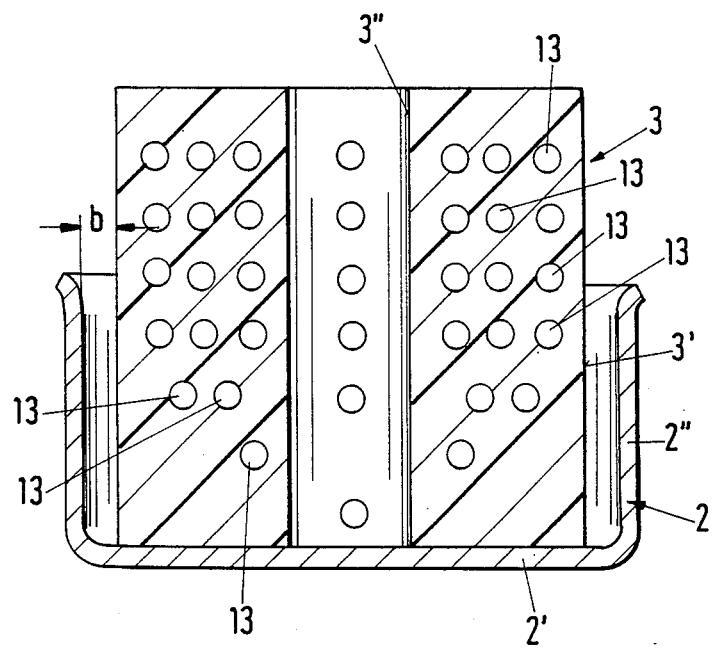
FIG. 2 is a fragmentary sectional view showing another embodiment of a mounting pad for use in a sound-insulating mount in accordance with the invention.

Another form of the resilient pad is shown in FIG. 2 in which the upper pan-shaped member and the tension device have been removed. In this case, the pad is formed with a plurality of transverse passages 13. Some of the passages are perpendicular to the plane of the drawing, as shown in FIG. 2, and some passages, not indicated in the drawing, are parallel to the plane of the drawing. According to one feature of the embodiment shown in FIG. 2, the number of passages 13 per unit of cross-sectional area is lower in the axial region of the side wall 2" of the member 2, i.e., in the region where the elastic limitation of pad displacement that becomes effective at high dynamic loads, than in the overlying region of the resilient pad 3 which is not surrounded by the wall 2". In this way, the properties of the limitation of pad displacement in the lateral direction can be controlled.

The invention thus provides a mount design with solid-conducted sound insulation which is suitable for fully automatic installation in a motor vehicle and which provides a simple arrangement for elastic limitation of resilient pad displacement.

Although the invention has been described herein with reference to specific embodiments, many modifications and variations of the invention will readily occur to those skilled in the art. Accordingly, all such variations and modifications are included within the intended scope of the invention.

We claim:

1. A sound-insulating mount for an internal combustion engine comprising at least one resilient pad means of elastomeric material, a pair of rigid force-transmitting members engaging opposed surfaces of the resilient pad means with pre-stress, and stop means for limiting the elastic radial displacement of the resilient pad means, the resilient pad means having a free surface portion between the opposed surfaces and the stop means comprising abutment means spaced from the free surface portion of the resilient pad means so that the free surface portion engages the abutment means to limit the deformation of the resilient pad means.

2. A sound-insulating mount according to claim 1 wherein the resilient pad means has greater hardness measured in the direction toward the abutment means in the region of the abutment means than in other regions of the resilient pad means.

3. A sound-insulating mount according to claim 2 wherein the resilient pad means is formed with transverse passages and the greater hardness is achieved by a variation in the arrangement of the passages.

* * * * *